United States Patent [19]
Garavaglia et al.

[11] 3,887,233
[45] June 3, 1975

[54] SHOULDER HARNESS AND LAP BELT RESTRAINT SYSTEM

[75] Inventors: Albert P. Garavaglia, Saratoga; Dennis S. Matsuhiro, San Jose, both of Calif.

[73] Assignee: The United States of America as represented by the National Aeronautics and Space Administration Office of General Counsel-Code GP, Washington, D.C.

[22] Filed: Mar. 19, 1974

[21] Appl. No.: 452,767

Related U.S. Application Data

[63] Continuation of Ser. No. 282,738, Aug. 22, 1972, abandoned.

[52] U.S. Cl.......... 297/389; 280/150 SB; 297/385; 297/388
[51] Int. Cl............................................ A62b 35/00
[58] Field of Search.................... 297/385, 388, 389; 280/150 SB; 244/122 R, 122 B

[56] References Cited
UNITED STATES PATENTS

| | | | |
|---|---|---|---|
| 2,192,109 | 2/1940 | Smith | 244/122 B |
| 2,576,867 | 11/1951 | Wilson, Jr. | 297/389 |
| 2,794,654 | 6/1957 | Sullivan | 297/389 |
| 2,825,581 | 3/1958 | Knight | 297/389 |
| 3,367,715 | 2/1968 | Curran | 297/385 |
| 3,386,683 | 6/1968 | Howland | 297/388 |
| 3,419,308 | 12/1968 | Apri | 297/389 X |
| 3,620,569 | 11/1971 | Mathis | 297/389 |
| 3,709,558 | 1/1973 | Jakob | 297/389 |

FOREIGN PATENTS OR APPLICATIONS

| | | | |
|---|---|---|---|
| 301,199 | 9/1965 | Netherlands | 297/389 |
| 611,065 | 12/1960 | Canada | 297/389 |
| 1,150,085 | 4/1969 | United Kingdom | 297/389 |

*Primary Examiner*—James T. McCall
*Attorney, Agent, or Firm*—Darrell G. Brekke; Armand G. Morin; John R. Manning

[57] ABSTRACT

A shoulder harness and lap belt restraint system are provided wherein the lap belt is combined with the shoulder harness in such a manner that a single fastening suffices to fasten both the shoulder strap and the lap belt.

8 Claims, 4 Drawing Figures

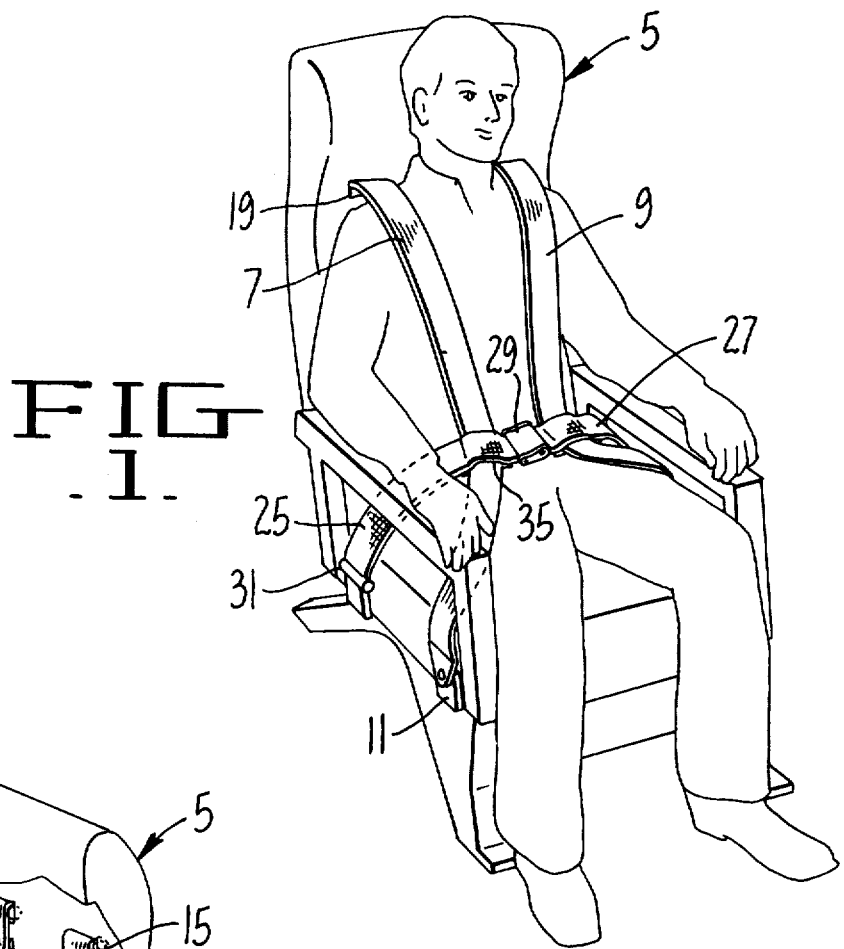
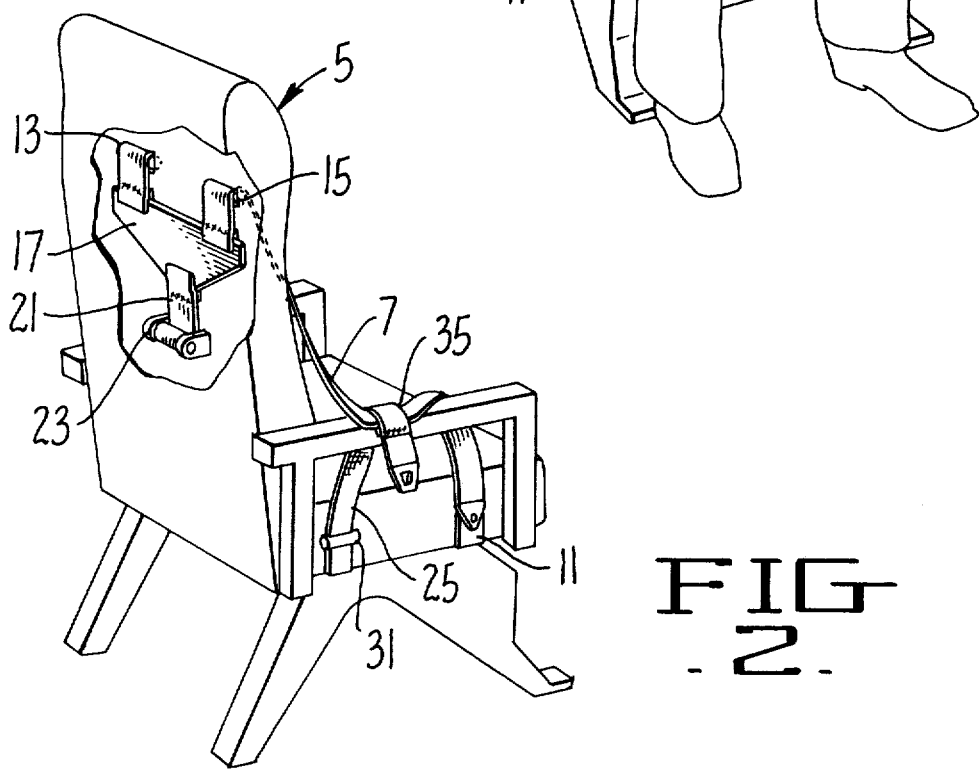

SHOULDER HARNESS AND LAP BELT RESTRAINT SYSTEM

The invention described herein was made by employees of the United States Government and may be manufactured and used by or for the Government for Governmental purposes without the payment of any royalties thereon or therefor.

This application is a continuation of Ser. No. 282,738, filed Aug. 22, 1972 by the same inventors and now abandoned.

BACKGROUND OF THE INVENTION

1. Field of the Invention

Combined shoulder harness and lap belt restraint system for use in automobiles, aircraft and the like.

2. Description of the Prior Art

Combined shoulder harnesses and lap belts have previously been known but they have suffered from a number of defects. Some of them have required separate movements to fasten the lap belt and the shoulder straps. Others have required adjustments depending upon the size of the user. Still others have restricted body movement to the extent that they are uncomfortable so that passengers frequently do not use them. Still others suffer from the defect of providing no protection from lateral collisions since the shoulder belt can easily slip off of the shoulders. Others have allowed the user to "submarine" so that the restraint is not applied to the strong pelvic area.

SUMMARY OF THE INVENTION

The present invention provides a shoulder harness which is held by inertia reels so that the user is not unduly restrained and can freely move about, yet the reels will instantly lock when the user is subjected to deceleration forces. The shoulder straps preferably pass through openings in the seat itself so that they are substantially at shoulder height and there is little chance of the straps slipping off of the shoulders. The combined restraint of the present invention provides for slippage between the lap belt and the shoulder straps so that it readily adapts itself to users of different sizes.

Thus, the present invention provides maximum protection for the user, yet is extremely easy to put on since it requires only the closure of a single buckle and the adjustment itself is done by inertia activated means.

BRIEF DESCRIPTION OF THE DRAWINGS

FIG. 1 is a perspective view showing a seat with a passenger therein with a combined shoulder harness and lap belt embodying the present invention.

FIG. 2 is a perspective rear view of the seat shown in FIG. 1 with a portion of the back cut away to show the inertia activated adjustment means.

DESCRIPTION OF THE PREFERRED EMBODIMENTS

Figure 3:
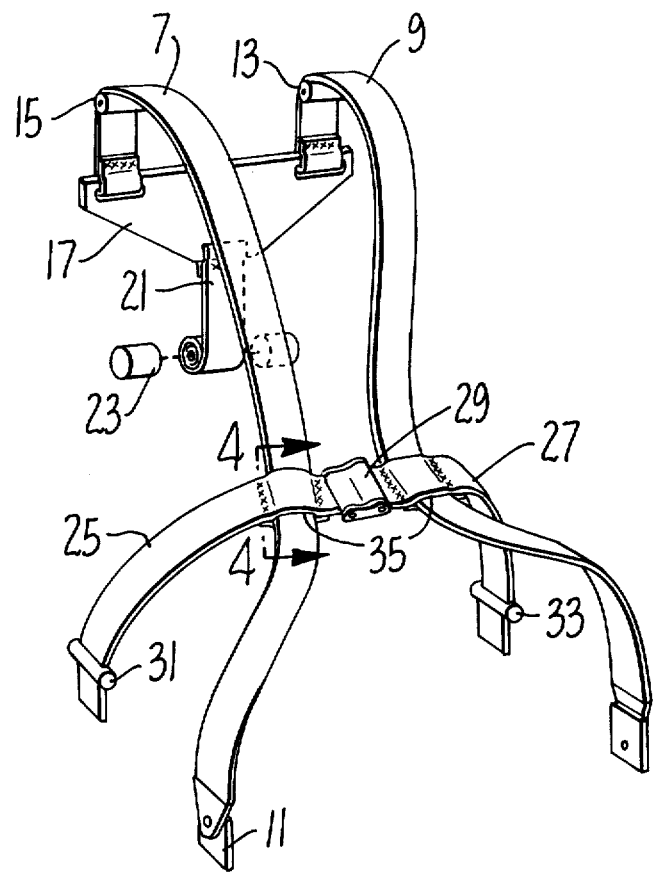
FIG. 3 is a perspective view showing the belt system by itself.

Referring now to the drawings by reference characters, there is shown a seat 5 which might be in an aircraft or other vehicle. Preferably the back of a seat is high, as shown, to protect the occupant from a whiplash injury although the invention is not limited to the use of such seat, as is later explained in detail. The seat is provided with two shoulder belts 7 and 9 which are suitably attached at their bottom ends to a position near the front of the seat as at 11. The top ends of the shoulder belt 9 pass over rollers 13 and 15 and are connected together by means of a yoke 17. In the embodiment shown the belts pass through slots 19 in the back of a seat although with a seat having a lower back, the rollers 13 and 15 might be placed on the top of the seat back. In any event, the rollers 13 and 15 are at about shoulder height for an average occupant. Yoke 17 is connected by means of webbing 21 to suitable inertial take-up roller 23. Such take-up rollers are well known to those skilled in the art and in effect, are self-adjusting. The roller is under spring tension and tends to wind up holding the webbing taut. If the webbing 21 is pulled gently outwardly, the roller permits the webbing to unwind. However, if there is a sudden shock, as in an accident, the webbing 21 cannot be jerked out rapidly but the roller locks, holding the belt in place.

Figure 4:
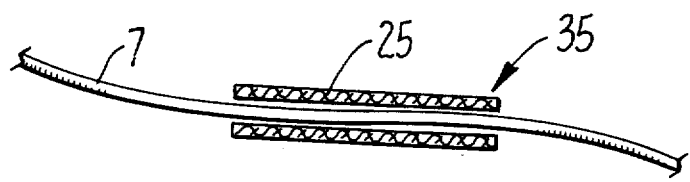
FIG. 4 is a section on the line 4—4 of FIG. 3.

A pair of lap belt halves 25 and 27 are provided, going over the lap of the user in the usual manner and are fastened together by means of a buckle 29. The bottom ends of the halves 25 and 27 are fastened to inertia rollers 31 and 33 which are of the same general structure as described above in conjunction with roller 23. Near the buckle of the lap belt, each of the lap belt halves is provided with a loop 35 of material through which the shoulder belt can easily slide. This is best seen in FIG. 4.

To use the restraint system of the present invention the user merely sits in the seat, and pulls the buckle 29 together. This fastens the lap belt and at the same time the lap belt slides along the shoulder restraint belts 7 and 9. The action of the inertial take-up rollers 31 and 33 is to normally tighten the belt across the lap of the user; similarly, the shoulder belt halves 7 and 9 are brought to a snug position by means of the roller 23. Thus, only a single movement, involving no adjustment whatsoever is necessary for the user of the restraint system of the present invention. Since it is so easy to use, there is little tendency on the part of occupants to neglect using the restraint.

The slip joint between the seats and shoulder belts prevents the seat belt from being pulled up into the vunerable abdominal area. There is not transmission of the shoulder strap loads to the lap belt which otherwise might tend to pull the lap belt from the structurally sound pelvic area into the vunerable abdominal area.

Since the shoulder strap ends pass over the sides of the legs and are secured to the front of the seat area, "submarining" of the body under the seat belt is avoided in the case of a severe crash. In many systems which have been proposed, the occupant would slip down or submarine so that the seat belt might actually be at his throat.

Since the shoulder belts pass over or through the seat at a point directly adjacent the shoulders of the user, the shoulder belts remain parallel and close together and thus give maximum protection from injuries which might result if one or both of the straps should slip off the shoulder. Further, excellent lateral protection is provided.

Many variations may be made from the exact structure shown without departing from the spirit of this invention. For instance, a single inertia roller has been shown for both of the shoulder belts but these could be on individual inertia rollers. A separate slip joint has been shown for allowing the shoulder straps to slip through the seat belt but this slipping arrangement could be made part of the buckle system of the lap belt. A swivel joint could be attached to the buckle to prevent buckle rotation or a guide added to the present belt folding.

We claim:

1. A restraint system for safely and securely restraining a person to a chair when a severe chair deceleration is encountered comprising:
   a chair having a back section for supporting said person's torso and a seat section for supporting said person's buttocks, said seat section having a forward portion remote from said back section and a rearward portion near said back section;
   first and second shoulder straps each having first and second ends;
   said first ends of said shoulder straps being fastened to said forward portion of said seat section and said first ends being spaced approximately the width of said person's thighs;
   first and second lap straps each having first and second ends;
   first and second spring-loaded, acceleration-sensitive strap retractors located at said rearward portion of said seat seciton and connected to said first ends of said first and second lap straps, respectively.
   said first and second retractors being spaced approximately the width of said person's buttocks;
   means for buckling together said second ends of said lap straps, said buckling means being substantially on an imaginary line vertically bisecting said person;
   said first and second lap straps each having an eye adjacent said second ends;
   said shoulder straps being threaded through said eyes, respectively, and said lap straps being free to move along said shoulder straps; and
   third spring-loaded, acceleration-sensitive strap retractor secured to said back section and connected to said second ends of said shoulder straps, respectively.

2. The restraint system of claim 1 wherein a yoke is interposed between the second ends of the said shoulder straps and the said third spring-loaded strap retractor.

3. The restraint system of claim 1 further comprising:
   first and second slots at shoulder height through the back section for passing said first and second shoulder straps and for preventing said shoulder straps from sliding off said person's shoulders.

4. The restraint system of claim 3 further comprising first and second rollers attached to the back of said back section and located adjacent said first and second slots, said first and second shoulder straps passing through said slots and extending downwardly over said rollers for attachment to said third spring-loaded strap retractor.

5. A shoulder harness and lap strap restraint system for safely restraining a person to a chair when subjected to severe deceleration forces comprising in combination:
   a chair having a back portion and a seat portion,
   a pair of shoulder straps arranged to pass over the shoulders of said person, each strap having first and second ends for attachment to the said chair,
   a pair of lap straps each having first and second ends, and each strap having a loop adjacent said second ends,
   first and second inertia take-up means secured to the side of said seat portion and attached to said first ends of said lap straps,
   means for buckling together said second ends of said lap strap
   said shoulder straps being threaded through said loops, and said shoulder straps being free to slide in said loops,
   third inertia take-up means secured to the back of said back portion,
   said first ends of said shoulder straps being attached to the side and front of said seat portion and said second ends being connected to said third inertia take-up means.

6. The restraint system of claim 5 wherein a yoke is interposed between the second ends of the said shoulder straps and the said third spring-loaded strap retractor.

7. The restraint system of claim 6 further comprising:
   first and second slots at shoulder height through the back portion for passing said first and second shoulder straps and for preventing said shoulder straps from sliding off said person's shoulders.

8. The restraint system of claim 7 further comprising first and second rollers attached to the back of said back portion and located adjacent said first and second slots, said first and second shoulder straps passing through said slots and extending downwardly over said rollers for attachment to said third inertia take-up means.

* * * * *